(12) United States Patent
Yoneyama

(10) Patent No.: US 6,459,724 B1
(45) Date of Patent: Oct. 1, 2002

(54) SLOT TIMING DETECTION METHOD AND CIRCUIT

(75) Inventor: Koh Yoneyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/266,797

(22) Filed: Mar. 12, 1999

(30) Foreign Application Priority Data

Mar. 13, 1998 (JP) .......................................... 10-063099

(51) Int. Cl.⁷ .............................................. H04L 27/30
(52) U.S. Cl. ...................................... 375/150; 375/147
(58) Field of Search ................................ 375/150, 147, 375/152

(56) References Cited

U.S. PATENT DOCUMENTS

| | | | |
|---|---|---|---|
| 5,673,260 A | 9/1997 | Umeda et al. | |
| 5,974,038 A | * 10/1999 | Shou et al. | 370/335 |
| 5,982,763 A | * 11/1999 | Sato | 370/342 |
| 6,067,315 A | * 5/2000 | Sandin | 370/252 |
| 6,301,294 B1 | * 10/2001 | Hara et al. | 375/152 |

FOREIGN PATENT DOCUMENTS

| | | |
|---|---|---|
| EP | 0 825 737 A1 | 2/1998 |
| JP | 07 297805 A | 11/1995 |
| JP | 9-55685 | 2/1997 |
| JP | 9-162847 | 6/1997 |
| KR | 97-4503 | 1/1997 |

* cited by examiner

Primary Examiner—Stephen Chin
Assistant Examiner—David B. Lugo
(74) Attorney, Agent, or Firm—Sughrue Mion, PLLC

(57) ABSTRACT

A slot timing detection method, where only data of power values which fall within upper N power values in a decreasing order are stored. The Nth data is a threshold. The thresholds in the slot intervals are accumulated to obtain a base value. Only a predetermined M data of power values is stored together with point information. When point information data corresponding to the N data fall within the M data, current data is added to the respective point data. When point information data corresponding to the N data fall outside the M data, current data is added to the base value. When the number of generated data is M or more, only upper M data are stored together with point information. When slot averaging is performed a predetermined number of times, the M data is divided by the predetermined number and an average value is determined.

9 Claims, 11 Drawing Sheets

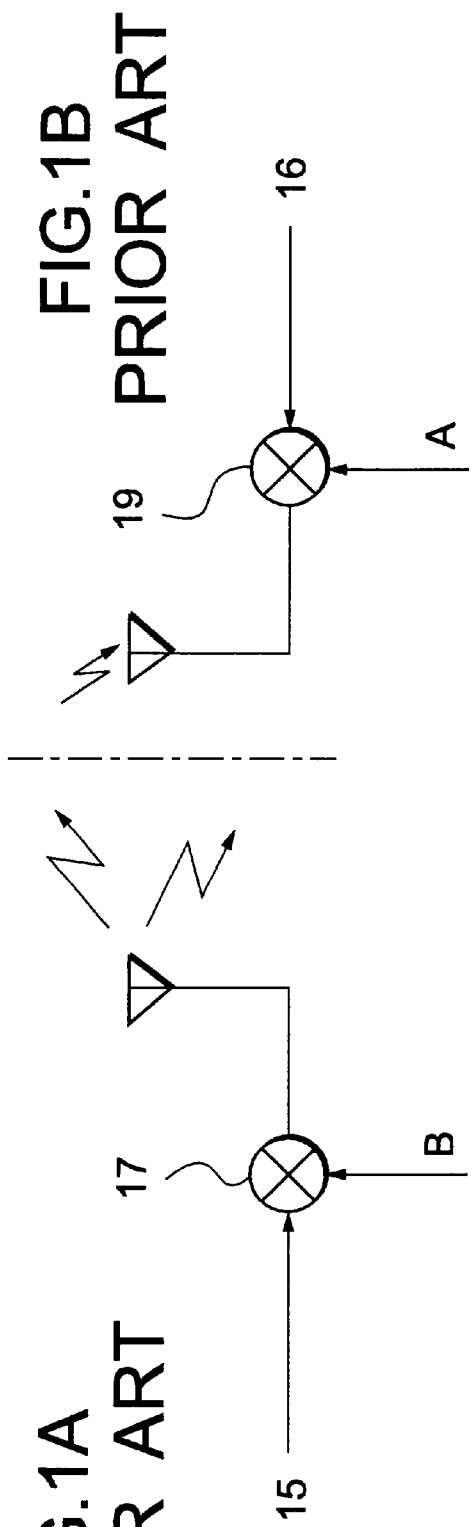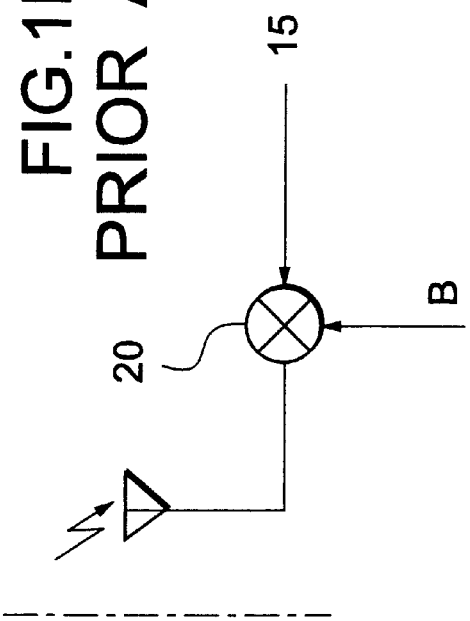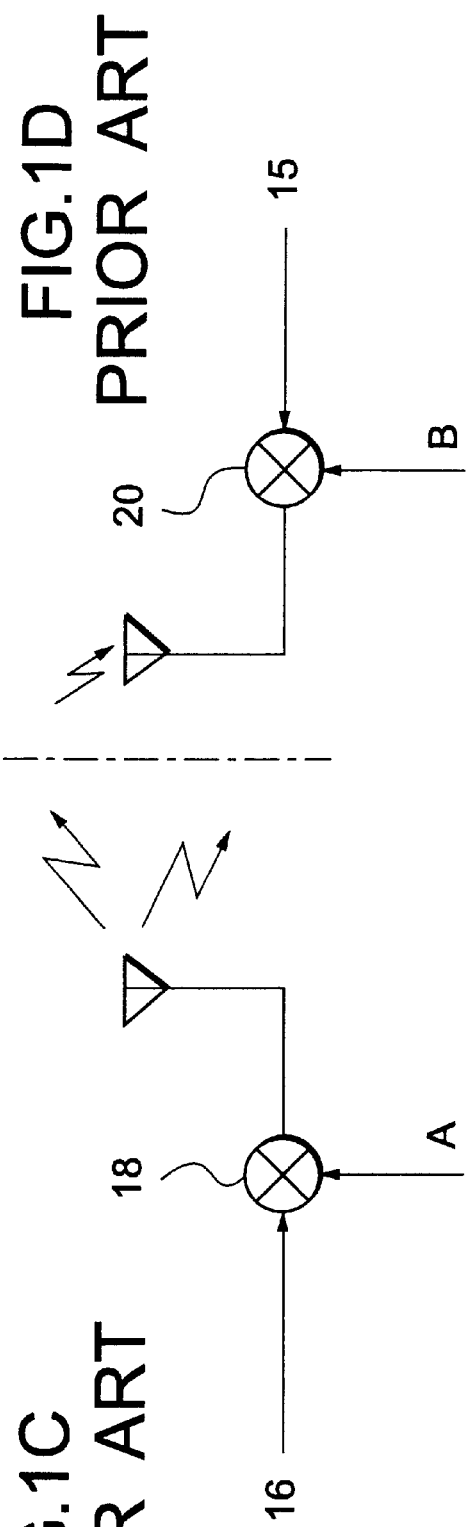

FIG.11
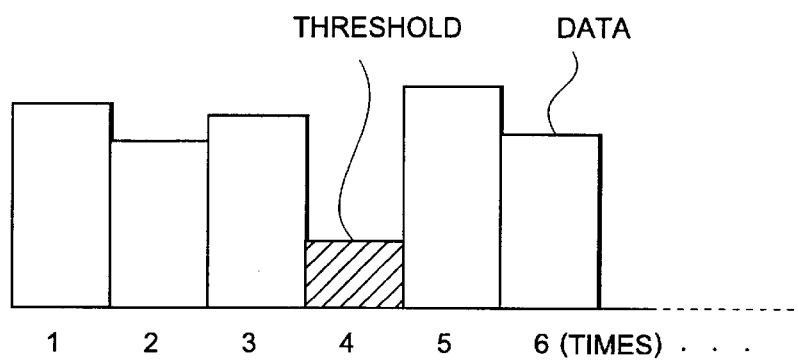
FIG.11A
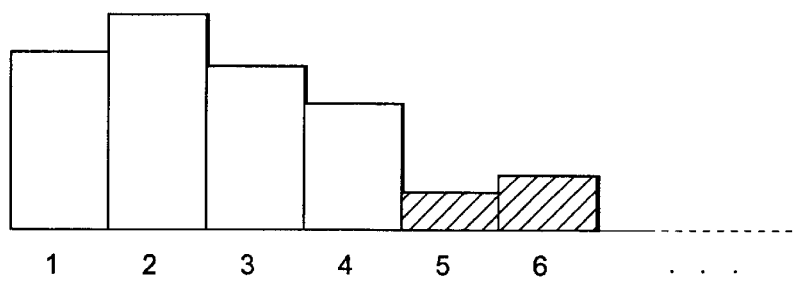
FIG.11B
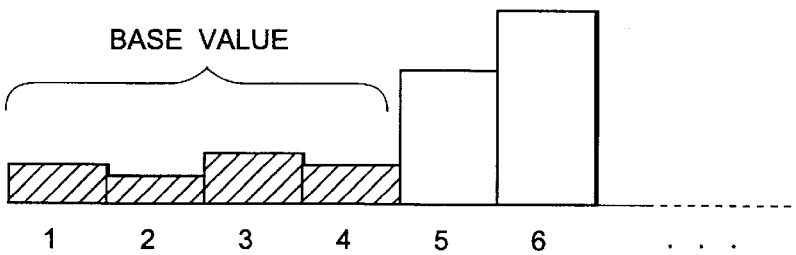
FIG.11C

SLOT TIMING DETECTION METHOD AND CIRCUIT

BACKGROUND OF THE INVENTION

1. Field of the Invention

The present invention relates to a CDMA mobile communication system and, more particularly, to a perch channel slot timing detection method and circuit in a W-CDMA (Wide-band Code Division Multiple Access) scheme, together with a mobile station and mobile communication system in a CDMA scheme.

2. Description of the Prior Art

In a CDMA transmission/reception system, as shown in FIGS. 1A to 1D, on the base station side, a spreading unit 17 spreads a logic symbol 15 with a spreading code B (see FIG. 1A), and a spreading unit 18 spreads a logic symbol 16 with a spreading code A (see FIG. 1C), thereby transmitting the logic symbols by using carrier waves having the same frequency. In this case, the transfer rate of spreading codes is several 10 to several 100 times the transfer rate of logic symbols. The period of such a spreading code is called a chip. On the receiver side on which the carrier waves are received, a despreading unit 19 can extract the logic symbol 16 by despreading the carrier wave with the spreading code A (see FIG. 1B), and a despreading unit 20 can extract the logic symbol 15 by despreading the carrier wave with the spreading code B (see FIG. 1D).

As described above, in the CDMA transmission/reception system, multiple access can be performed using the same frequency by performing spreading/despreading operation with a plurality of spreading codes.

These spreading codes include long codes (long-period spreading codes) and short codes (short-period spreading codes). In a W-CDMA scheme, logic symbols are double-spread with these long and short codes.

In this case, a long code is a code having a very long period corresponding to several 10 to several 100 symbols, where as a short code is a code having a short period corresponding to one symbol.

FIG. 2 shows the arrangement of the transmission section of a CDMA transmitter designed to perform double-spreading.

The transmission section of this CDMA transmitter includes a baseband modulator 60, a clock signal generator 61, a short code generator 63, a long code generator 64, exclusive OR circuits (EX-ORs) 65 and 66, a multiplier 67, a carrier wave generator 68, and an amplifier 69. In addition, the exclusive OR circuits 65 and 66 constitute a spreading unit 70.

The baseband modulator 60 receives a digital signal and converts it into a baseband-modulated signal. The exclusive OR circuit 65 multiplies this baseband-modulated signal by a short code output from the short code generator 63, thus spreading the spectrum. The exclusive OR circuit 66 multiplies the baseband-modulated signal by a long code output from the long code generator 64, thus spreading the spectrum. In this case, the short and long codes have the same chip period, and both the short code generator 63 and the long code generator 64 are driven by clock signals generated by the clock signal generator 61.

The multiplier 67 multiplies the spread baseband-modulated signal output from the exclusive OR circuit 66 by a carrier wave generated by the carrier wave generator 68. The resultant signal is amplified by the amplifier 69 and transmitted as a transmission modulated wave from an antenna.

In this CDMA transmission/reception system, however, despreading cannot be properly performed on the receiver side unless the spreading timing at which the base station performs spreading is accurately obtained. Even a deviation of one chip from this spreading timing makes the receiver unable to receive any signals transmitted from the base station. In a W-CDMA scheme, which is one of the CDMA schemes, since synchronization between output signals is not established between base stations, the receiver must establish synchronization every time the base station to which the receiver is connected is changed.

In addition, since each base station uses a plurality of spreading codes, the spreading codes used by the base station to which the receiver is to be radio-connected cannot be known in advance. For example, in the W-CDMA scheme, 32 types of short codes are prepared, but the receiver cannot specify which short codes, of the 32 types of short codes, the base station to which the receiver is to be connected is using. If the spreading codes used by the base station cannot be specified, no information can be obtained from the base station. The receiver cannot therefore be radio-connected to the base station.

A perch function is designed to solve this problem. The perch function is the function of allowing a receiver to obtain base station information, e.g., the spreading codes used by a base station in spreading logic symbols and the spreading timing. The receiver uses this perch function to know various information about the base station, e.g., the spreading codes in use and the spreading timing, by performing a perch search, thereby establishing radio connection.

FIG. 3 is a block diagram showing the transmission/reception section of a mobile station having such a perch function.

As shown in FIG. 3, the transmission/reception section of the mobile station is comprised of an RF/IF section 21, a transmission section 22, and a reception section 23.

The transmission section 22 outputs a baseband signal, which is to be transmitted from the receiver to a base station, to the RF/IF section 21.

The RF/IF section 21 modulates a carrier wave with the baseband signal output from the transmission section 22 and transmits the carrier wave to the base station. The RF/IF section 21 also demodulates a signal transmitted from the base station and outputs the signal to the reception section 23.

The reception section 23 includes a finger reception section 24, a search section 25, a perch search section 26, and a rake reception section 27.

The perch search section 26 obtains various information about the base station from the baseband signal demodulated by the RF/IF section 21, and outputs the information to the subsequent circuit. The perch search section 26 has a slot timing detection circuit 28 for detecting the slot timing of the base station from which signals are currently received. The slot timing is the timing at which time slots as units of data are transmitted from the base station. Since this slot timing is identical to the spreading timing, the spreading timing can be obtained by obtaining the slot timing.

The search section 25 detects a timing deviation between direct and reflected waves due to multipath components in a baseband signal.

The finger reception section 24 delays the baseband signal in accordance with the timing deviation detected by the search section 25 to correct the timing deviation between signals.

The rake reception section 27 synthesizes the signals received by the finger reception section 24 at an optimal ratio, and outputs the resultant signal to the subsequent circuit.

FIG. 4 shows the data structure of a perch channel 30 received by the perch search section 26.

The perch channel 30 is one of 640 msec super frames and made up of 64 radio frames $31_1$ to $31_{64}$ that are used to transfer information for each receiver.

The radio frame $31_1$ consists of 16 time slots $32_1$ to $32_{16}$. The time slot $32_1$ consists of a pilot symbol 33, BCCH (Broadcast CHannel) symbol 34, and a long code mask symbol 35.

A W-CDMA scheme using short codes each having a spreading code length of 256 chips will be described below. One bit of a logic symbol is therefore spread to 256 chips.

The long code mask symbol 35 is a signal obtained by spreading a given 1-bit logic symbol with only a short code without using any long code. All logic symbols other than the long code mask symbol 35 are spread with both long and short codes as spreading codes. For this reason, when the signal demodulated by the RF/IF section 21 is despread with only a short code, only the long code mask symbol 35 appears as the original symbol. The slot timing detection circuit 28 detects the slot timing by using this mechanism.

FIG. 5 shows the arrangement of the conventional slot timing detection circuit 28 in FIG. 3.

The slot timing detection circuit 28 is comprised of an A/D converter 8, a correlation detection section 9, a power calculation section 11, an average calculation section 57, and a storage section 51.

The A/D converter 8 A/D-converts the baseband signal output from the RF/IF section 21 into digital data 4 which is a straight binary signal having a bit width of eight bits.

The correlation detection section 9 calculates the correlation between the digital data 4 output from the A/D converter 8 and the short code, and outputs the result as a correlation result 44.

The power calculation section 11 converts the correlation result 44 output from the correlation detection section 9 into a 32-bit power value, and outputs it.

Assume that the power calculation section 11 performs four-times sampling, the short code has a spreading length of 256 chips, and the number of symbols of one time slot is 10. In this case, the number of points which is the number of data output from the power calculation section 11 in a 1-slot interval is 4 (four-times sampling)×256 (chips)×10 (symbols)=10,240.

The average calculation section 57 calculates the average of the power values of the correlation results 44 output from the power calculation section 11.

The storage section 51 is made up of a RAM and the like to store all the data of the average values (10,240 words×32 bits) calculated by the average calculation section 57.

In this conventional receiver, a slot timing is obtained first by using the long code mask symbol 35, and other pieces of information from the base station are then obtained by using this slot timing.

In practice, the correlation detection section 9 may be designed to use a matched filter for simultaneously calculating the correlations between spreading codes and the digital data 4, which are held in amount corresponding to the spreading code length, or to use a correlator bank for sequentially calculating the correlation between each spreading code and the digital data 4 and accumulating the resultant data. In this case, the correlation detection section 9 uses a matched filter.

FIG. 6 is a block diagram showing the correlation detection section 9 including the matched filter.

This matched filter is comprised of dynamic flip-flop circuits (DFFs) $10_1$ to $10_{256}$, exclusive OR circuits (EX-ORs) $42_1$ to $42_{256}$, and an adder 40.

The dynamic flip-flop circuits $10_1$ to $10_{256}$ sequentially hold the 8-bit digital data 4 in units of chip rates, respectively.

The exclusive OR circuits $42_1$ to $42_{256}$ respectively calculate the exclusive ORs between short codes $5_1$ to $5_{256}$ and the digital data 4 which are the 8-bit signals respectively held in the dynamic flip-flop circuits $10_1$ to $10_{256}$.

The adder 40 adds the outputs from the exclusive OR circuits $42_1$ to $42_{256}$ and outputs the sum as the correlation result 44.

The operation of this matched filter will be described next.

The digital data 4 converted into the 8-bit signals are sequentially held in the dynamic flip-flop circuits $10_1$ to $10_{256}$. The exclusive OR circuits $42_1$ to $42_{256}$ then calculate the exclusive ORs between the digital data 4 and the short codes $5_1$ to $5_{256}$.

Although the operation of the exclusive OR circuits $42_1$ to $42_{256}$ will be described by taking the exclusive OR circuit $42_1$ as an example, the exclusive OR circuits $42_2$ to $42_{256}$ perform the same operation.

In calculation of an exclusive OR in the exclusive OR circuit $42_1$, if the short code $5_1$ is "0", the data held in the dynamic flip-flop circuit $10_1$ is output without any change, whereas if the short code $5_1$ is "1", the data held in the dynamic flip-flop circuit 101 is logically inverted and output.

The adder 40 adds all the outputs from the exclusive OR circuits $42_1$ to $42_{256}$ and outputs the sum as the correlation result 44. When the correlation result 44 becomes a large value, the digital data 4 coincide with the short codes $5_1$ to $5_{256}$. The receiver can obtain the slot timing of the base station from this timing.

The power calculation section 11 converts the correlation result 44 obtained in this manner into a 32-bit power value and outputs it. The number of bits of this power value is not limited to 32 as long as the magnitude of power value can be satisfactorily expressed.

FIG. 7 shows the power values at the respective points at which they are changed by the power calculation section 11. Referring to FIG. 7, for the sake of description, actual data of power values at 10,240 points in a 1-slot interval are artificially generated and expressed as a graph. In this case, when the correlation result 44 exhibits large power values, the digital data 4 coincide with the short codes $5_1$ to $5_{256}$. In this graph, there are a plurality of such points (six). This indicates that the receiver is receiving radio waves from a plurality of base stations.

This graph shows the power value data in a 1-slot interval. In a mobile communication system constituted by a mobile station and a plurality of base stations, since the mobile station communicates with the base stations while moving, the obtained power value greatly varies owing to fading and the like. If the magnitude of fading is large, the power value greatly decreases. As a result, the receiver may apparently receive no radio wave from the base station.

Such a problem is solved by performing slot averaging processing of calculating the average of power value data in units of slot intervals to prevent an operation error caused by omission of data due to fading, instead of detecting a slot timing on the basis of one power value data.

Slot average calculation processing in the conventional slot timing detection circuit will be described next.

The average calculation section 57 continuously receives 32-bit power values from the power calculation section 11 at the respective points. The average calculation section 57 reads out the cumulative value of the past power values input at the respective points from the storage section 51, and adds the readout cumulative value and the input data to obtain a new cumulative value, and stores it in a corresponding area in the storage section 51.

Although slot average calculation processing at one point has been described above, the same operation is performed at 10,240 points. To calculate the average of all data in units of slot intervals, the slot timing detection circuit 28 must store 10,240×32-bit data in the storage section 51. As the storage section 51 for storing such a large volume of data, a register such as F/Fs (flip-flops) whose storage capacity is small cannot be used, and an external RAM or the like is required.

To perform slot average calculation processing of data at a given point which is input from the power calculation section 11, the average calculation section 57 must temporarily reads out the data at the point from the storage section 51, performs calculation between the readout value and the input data, and writes the obtained new data in the storage section 51. When slot average calculation processing at 10,240 points in a 1-slot interval is complete, this processing is repeated by a predetermined number of times of averaging.

If, therefore, an external RAM is used as the storage section 51, the external RAM must be frequently accessed. Since it takes a longer period of time to access the external RAM than to read/write data from/in registers such as F/Fs, a longer period of time is required for slot averaging processing.

When slot averaging processing is performed a predetermined number of times, the average calculation section 57 divides each data stored in the storage section 51 by the number of times of averaging, and obtains the average of the resultant data. The average calculation section 57 then outputs points at which large average power values appear as slot timings for the respective base stations.

The following problems are posed in the conventional slot timing detection circuit described above.

(1) Since a storage means for storing a large volume of data is required, the circuit size becomes large.

(2) Since a long period of time is required to access a storage means capable of storing a large volume of data, a long period of time is required for slot average calculation processing.

SUMMARY OF THE INVENTION

The present invention has been made in consideration of the above situation in the prior art, and has as its object to provide a slot timing detection method and circuit which can reduce the storage capacity required for slot average calculation processing and shorten the processing time.

It is another object of the present invention to provide a mobile station having a slot timing detection circuit of the present invention.

It is still another object to provide a mobile communication system constituted by a mobile station having the slot timing detection circuit of the present invention, and a plurality of base stations.

In order to achieve the above objects, according to the first aspect of the present invention, there is provided a slot timing detection method of expressing correlation results as power values every time received data is despread, calculating an average of the power values in a plurality of slot intervals, and detecting a slot timing as a timing of transmission of time slots from a base station by using data of the obtained average, comprising the steps of storing only data of power values, of power values at points as the ordinal numbers of data, which fall within predetermined upper N power values in a decreasing order of power values, and setting Nth data as a threshold, accumulating the thresholds in the respective slot intervals to obtain a base value, storing only predetermined M data of the data of the power values in correspondence with point information, when data corresponding to the points corresponding to the N data fall within the M data, adding currently obtained data to the data at each point to generate new data, when data corresponding to the points corresponding to the N data fall outside the M data, adding currently obtained data to the base value to generate new data, generating new data by adding the threshold to data, of the M data, which corresponds to a point at which no data falls within the N data, when the number of newly generated data is not less than M, storing only upper M data together with point information, and when slot averaging is performed a predetermined number of times, dividing the M data by the predetermined number and outputting the quotient as an average value.

In order to achieve the above objects, according to the second aspect of the present invention, there is provided a slot timing detection circuit for expressing correlation results as power values every time received data is despread, calculating an average of the power values in a plurality of slot intervals, and detecting a slot timing as a timing of transmission of time slots from a base station by using data of the obtained average, comprising a correlation detection section for obtaining correlations between spreading codes and digital data obtained by A/D-converting a baseband signal obtained by demodulating a received signal, and outputting the obtained correlations as correlation values in units of chip rates, a power calculation section for converting the correlation values output from the correlation detection section into power values in units of points as ordinal numbers of data, an upper N values detecting section for storing only data of power values, of the power values at the respective points output from the power calculation section, which fall within predetermined upper N power values in a decreasing order of power values, and setting Nth data as a threshold, a base value calculation section for obtaining a base value by accumulating thresholds obtained by the upper N values detecting section, a storage section for storing predetermined M data of the data of the power values in correspondence with point information, and an average calculation section for loading M data stored in the storage section, together with corresponding points, when data corresponding to points corresponding to the N data input from the N values detection section are present in the loaded data, generating new data by adding currently obtained data to the data at the corresponding points, when data corresponding to points corresponding to the N data input from the N values detection section are not present in the loaded data, generating new data by adding currently obtained data to the base value, generating new data by adding the threshold to data, of the loaded data, which corresponds to a point at which no corresponding data is output from the upper N values detecting section, when the number of newly generated data is not less than M, storing only upper M data in the storage section, together with point information, when slot averaging is performed a predetermined number of times, dividing the data stored in the storage section by the predetermined number and outputting the quotient as an average value.

The upper N values detecting section stores only the upper N data of the data of the power values obtained by the power calculation section, and sets the Nth data as a current threshold. The base value calculation section obtains a base value by accumulating thresholds. The average calculation section stores only M data in the storage section. If the input N data have already been stored in the storage section, the average calculation section adds the currently obtained data to the stored data. If such data are not stored, the average calculation section adds the currently obtained data to the base value as past data to generate new data. If data corresponding to the data stored in the storage section are not input, the threshold is added to the corresponding data to generate new data.

The present invention can reduce the memory capacity required for slot average calculation processing and decrease the number of times of access to the storage section as compared with slot averaging processing in which all the data at the respective points are stored and averaged. The present invention can therefore greatly shorten the processing time.

According to still another aspect of the present invention, the correlation detection section is a matched filter.

According to still another aspect of the present invention, the correlation detection section is a correlator bank.

According to still another aspect of the present invention, N is equal to M.

The above and many other objects, features and advantages of the present invention will become manifest to those skilled in the art upon making reference to the following detailed description and accompanying drawings in which preferred embodiments incorporating the principles of the present invention are shown by way of illustrative examples.

BRIEF DESCRIPTION OF THE DRAWINGS

FIGS. 1A to 1D are views for explaining a CDMA reception scheme;

FIGS. 11A to 11C are graphs each showing changes in power value to explain the operation of the slot timing detection circuit in FIG. 8.

DETAILED DESCRIPTION OF THE PREFERRED EMBODIMENT

A preferred embodiment of the present invention will be described in detail next with reference to the accompanying drawings.

Figure 8:
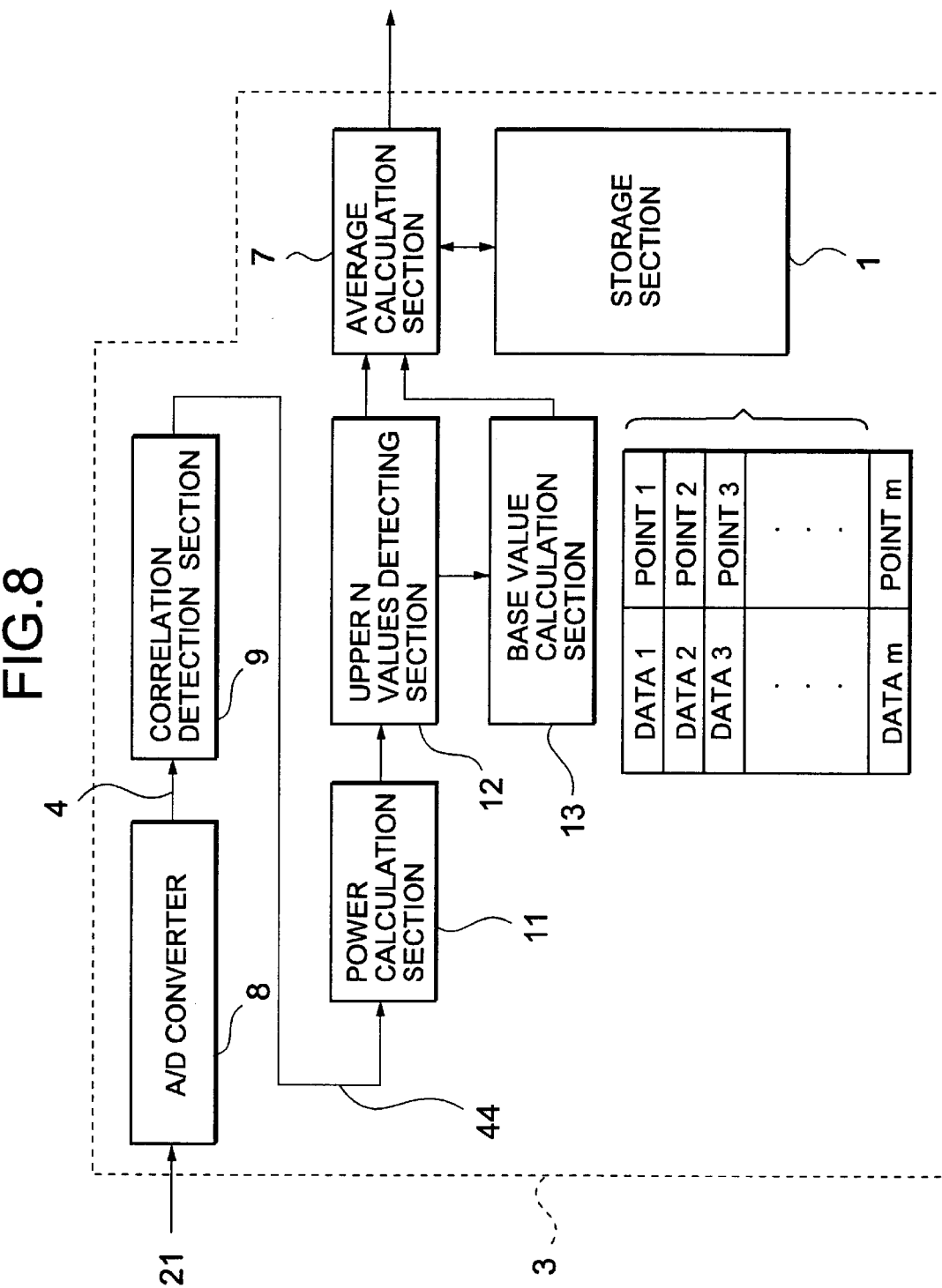
FIG. 8 is a block diagram showing the arrangement of a slot timing detection circuit according to an embodiment of the present invention.

FIG. 8 is a block diagram showing the arrangement of a slot timing detection circuit 3 according to an embodiment of the present invention. The same reference numerals in FIG. 8 denote the same parts as in FIG. 5.

Figure 2:
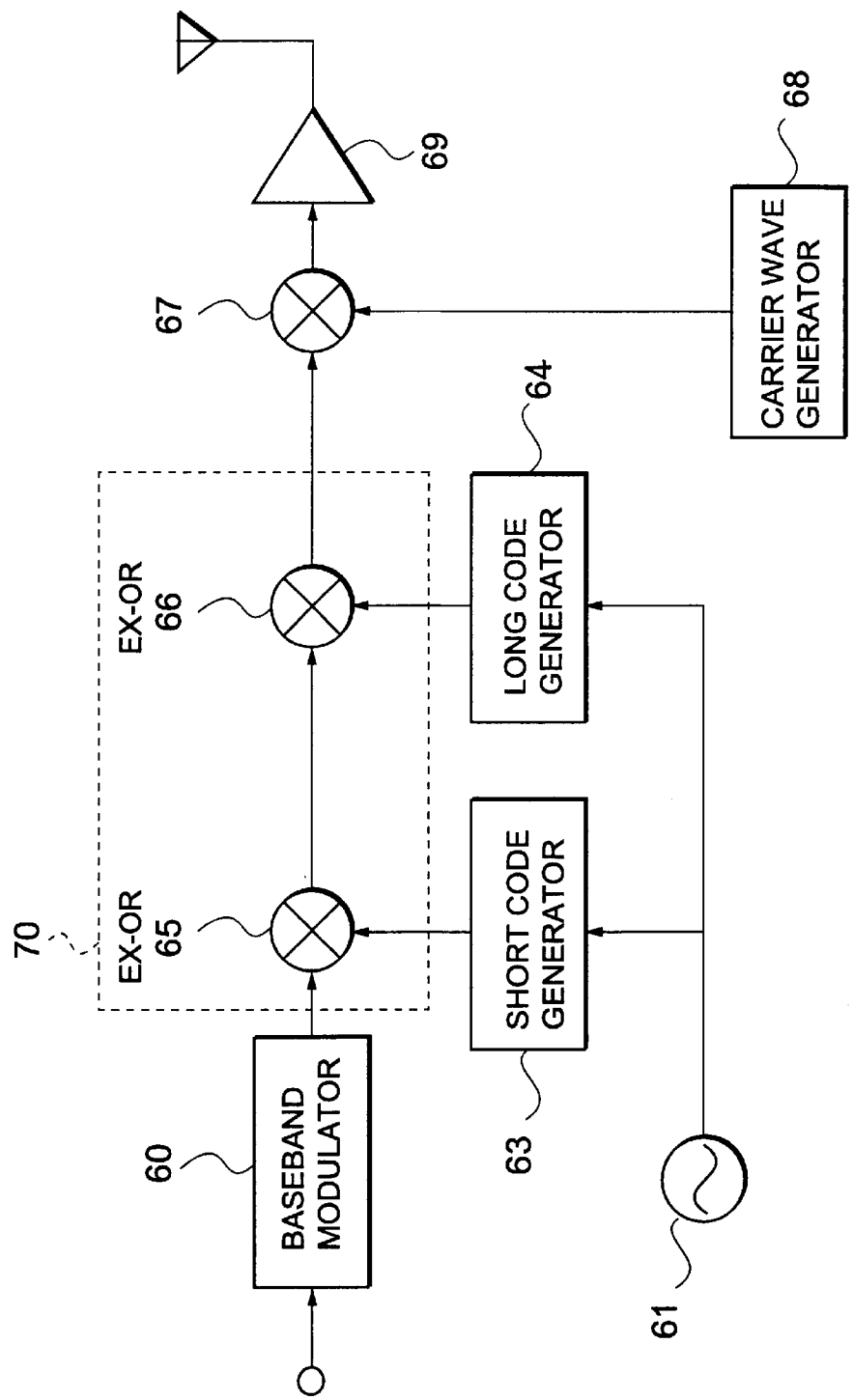
FIG. 2 is a block diagram showing the arrangement of the transmission section of a CDMA transmitter.
Figure 3:
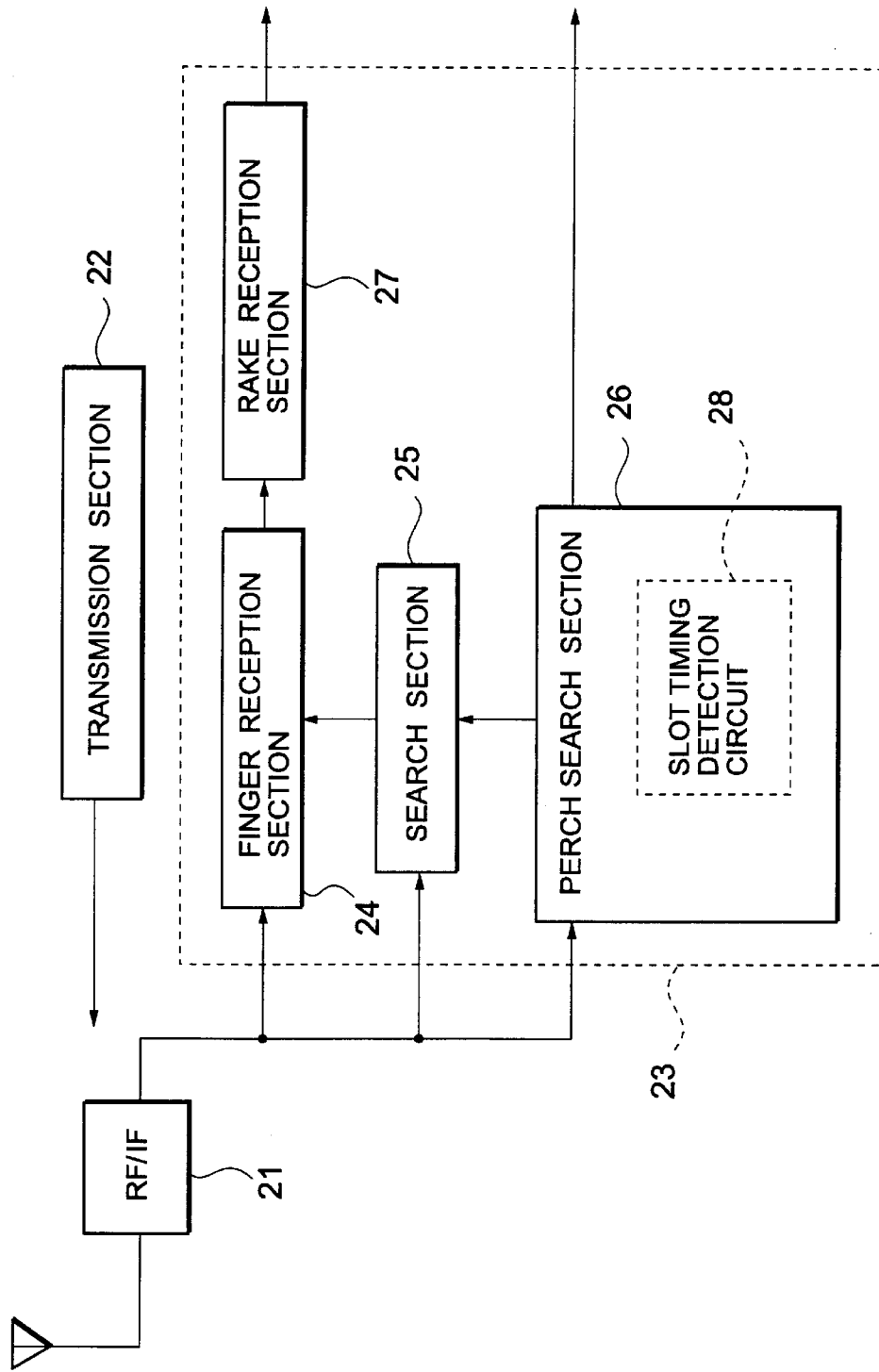
FIG. 3 is a block diagram showing the arrangement of the transmission/reception section of a CDMA receiver having a perch function.
Figure 4:
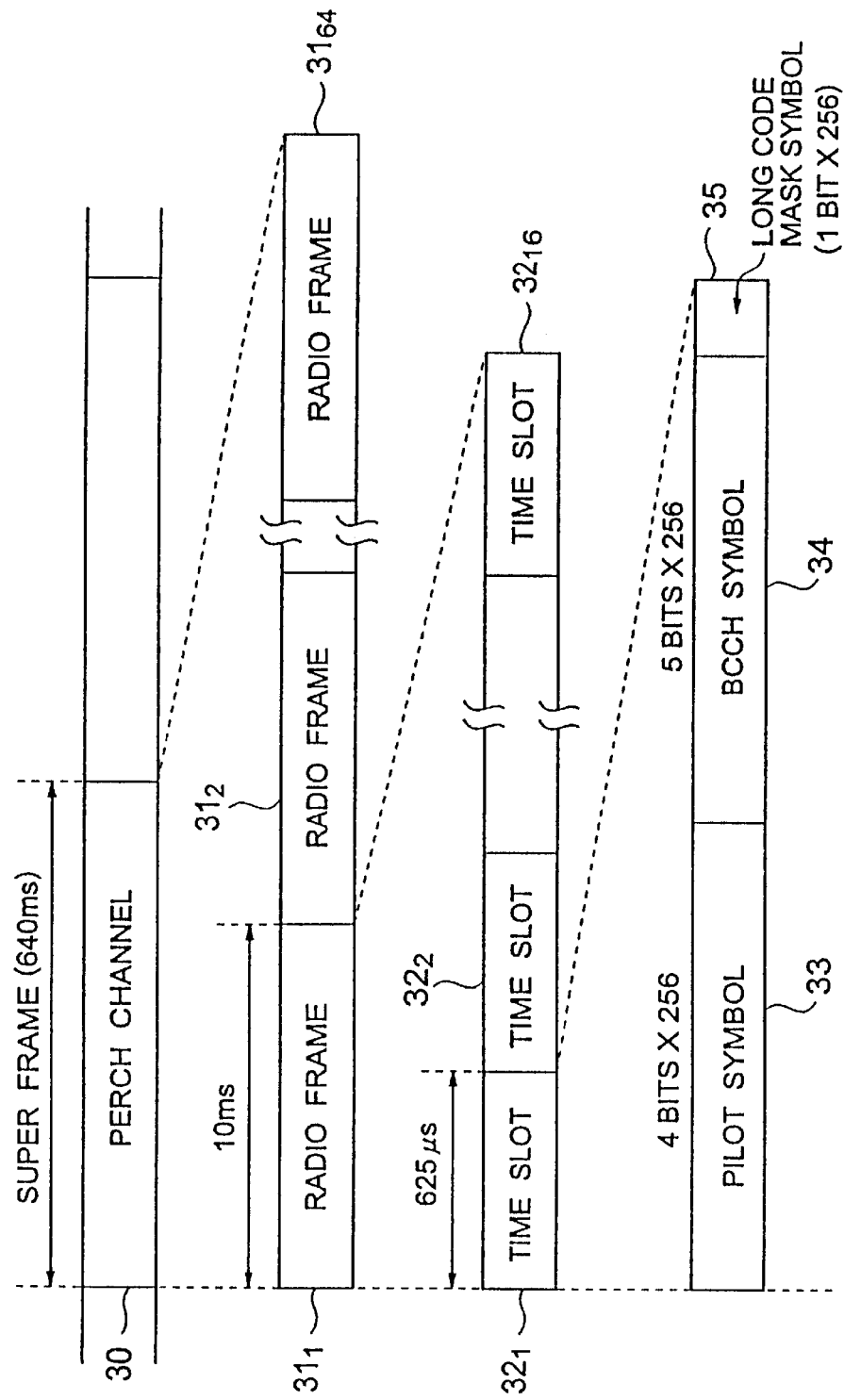
FIG. 4 is a data format showing the data structure of a perch channel.
Figure 5:
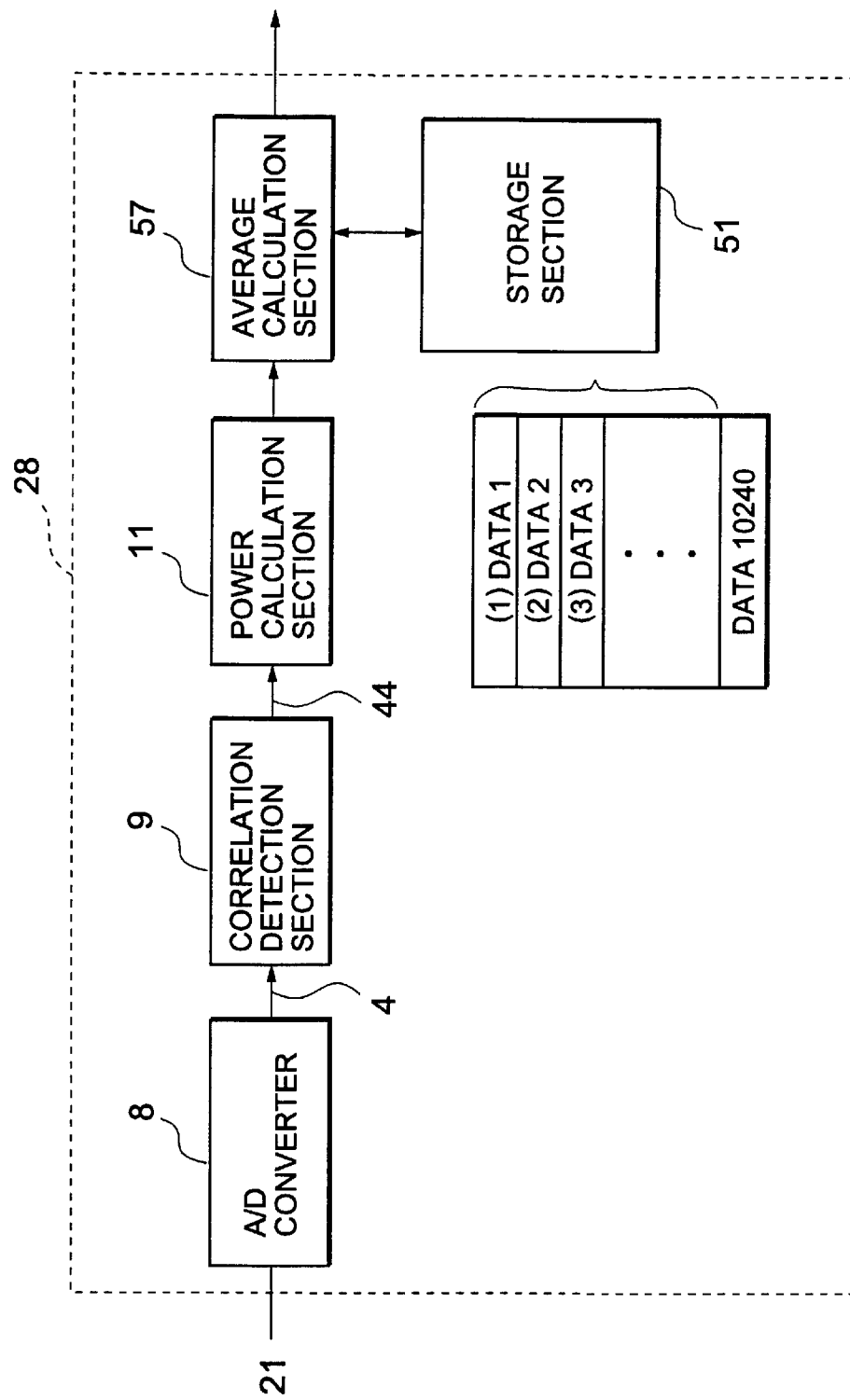
FIG. 5 is a block diagram showing the arrangement of a perch search section in FIG. 2.
Figure 6:
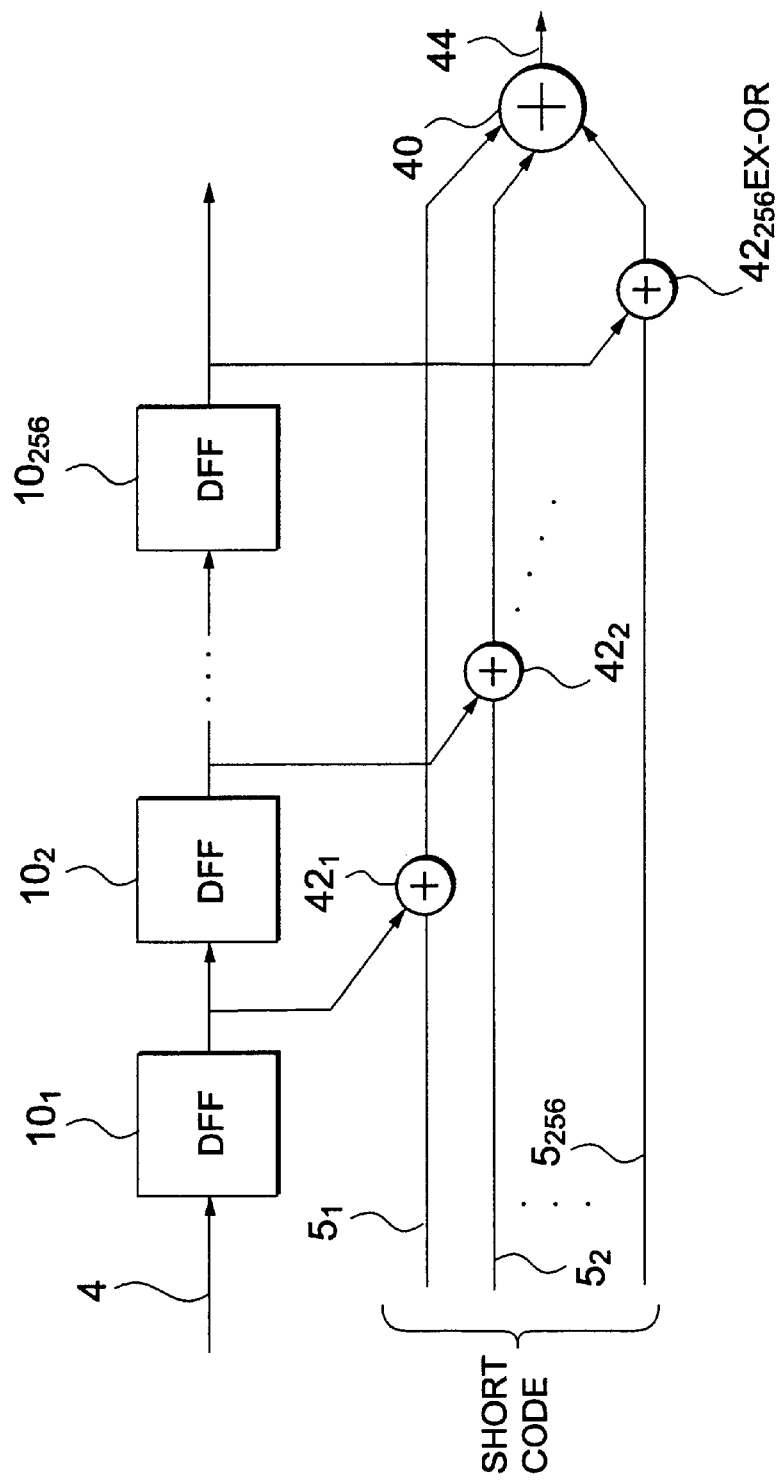
FIG. 6 is a block diagram showing the arrangement of a matched filter in FIG. 5.

The slot timing detection circuit 3 of this embodiment uses an average calculation section 7 and a storage section 1 in place of the average calculation section 57 and storage section 51 of the slot timing detection circuit 28 in FIG. 5, and additionally includes an upper N values detecting section 12 and a base value calculation section 13 between a power calculation section 11 and the average calculation section 7.

The upper N values detecting section 12 stores N data, of the power values at the respective points which are obtained by the power calculation section 11 upon conversion, in the decreasing order of power values, and sets the Nth data as a threshold. At the end of a 1-slot interval, the upper N values detecting section 12 outputs the N data to the average calculation section 7, together with the corresponding point information, and outputs the threshold to the base value calculation section 13.

The base value calculation section 13 obtains a base value by accumulating the thresholds obtained by the upper N values detecting section 12, and stores it.

The average calculation section 7 performs following processing for the N data and corresponding point information input from the upper N values detecting section 12.

(1) If data at a given point has already been stored in the storage section 1, the currently obtained data is added to the stored data to generate new data.

(2) If no data at a given point is stored in the storage section 1, the currently obtained data is added to the base value to generate new data.

(3) The threshold is added to data at any point at which the corresponding data is stored in the storage section 1 and no new data is generated by the current processing.

The average calculation section 7 sorts (rearranges) the new data in the decreasing order. If the number of new data exceeds the predetermined number M, the average calculation section 7 discards data other than the upper M data, and stores the M data in the storage section 1, together with the corresponding point information.

The storage section 1 stores the 32-bit data calculated by the average calculation section 7 in correspondence with the pieces of point information each expressed by 14 bits.

Figure 7:
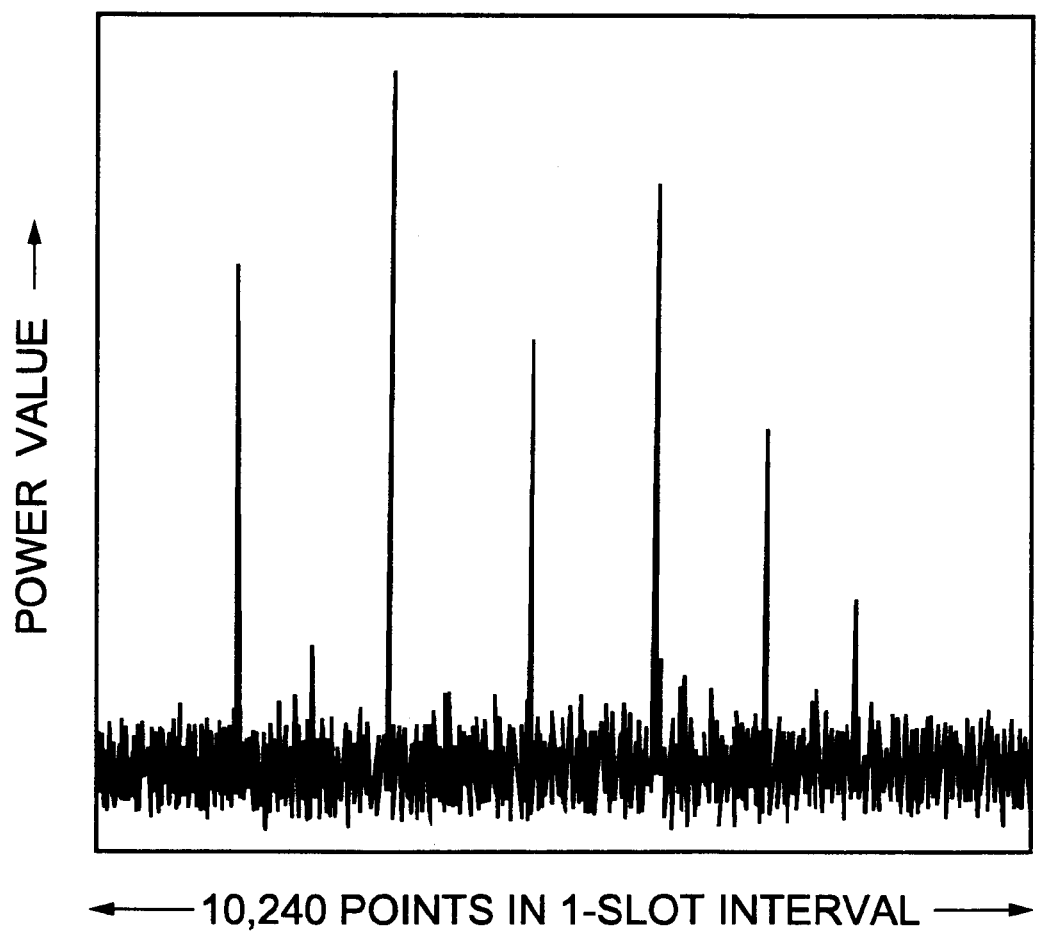
FIG. 7 is a graph showing power values at the respective points in the correlation results output from the matched filter.
Figure 9:
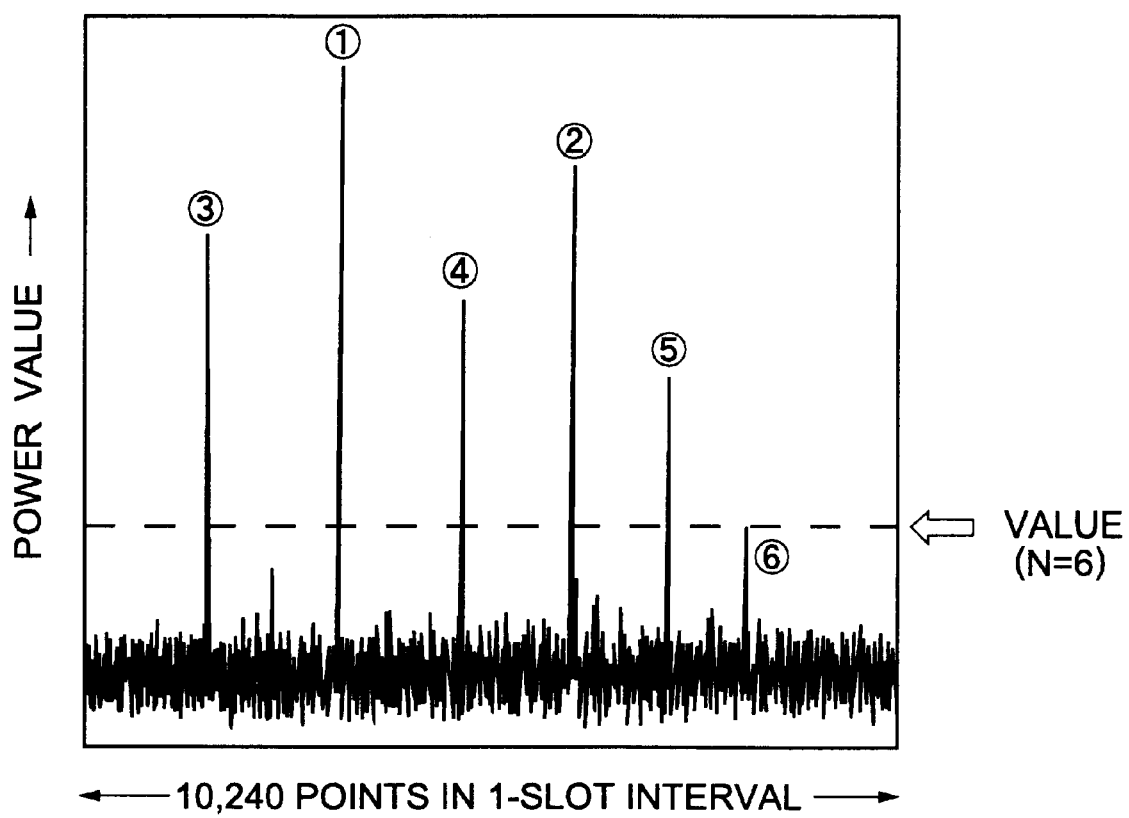
FIG. 9 is a graph showing power values at the respective points in the correlation results output from a matched filter.
Figure 10:
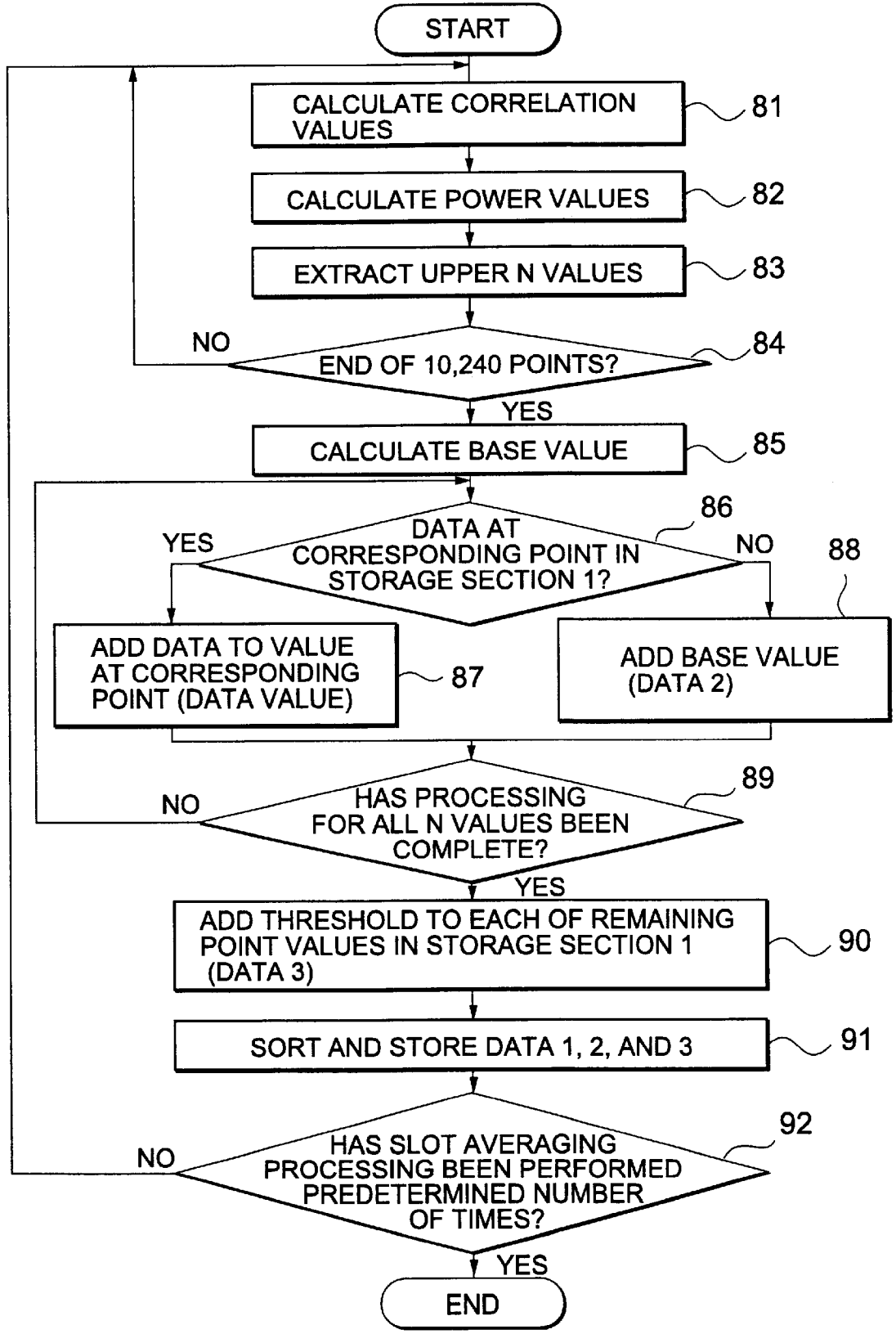
FIG. 10 is a flow chart for explaining the operation of the slot timing detection circuit in FIG. 8.

The operation of this embodiment will be described next with reference to FIGS. 8, 9, and 10. FIG. 9 is a graph showing the power values at the respective points in a correlation result 44 output from the power calculation section 11. FIG. 10 is a flow chart showing the operation of the slot timing detection circuit 3. Similar to FIG. 7, FIG. 9 is a graph showing the data artificially generated from actual data for the sake of description.

Referring to the graph of FIG. 9, the decreasing order of power values is indicated by ① to ⑥. Since N is 6 in FIG. 9, the value of the upper sixth data indicated by ⑥ is set as a threshold.

The operation of the slot timing detection circuit 3 will be described with reference to the flow chart of FIG. 10.

First of all, an A/D converter 8 converts data from an RF/IF section 21 into 8-bit digital data 4. A correlation detection section 9 calculates the correlation values between the digital data 4 and short codes and outputs the calculated values as the correlation results 44 (step 81). The power calculation section 11 converts the correlation results 44 into power values (step 82). The upper N values detecting section 12 holds only upper N data (up to sixth data in FIG. 9) of the power values (step 83). When the above operation is performed for all the data at 10,240 points (step 84), the Nth data in the upper N values detecting section 12 is output as a threshold to the base value calculation section 13. The base value calculation section 13 accumulates the thresholds and stores the resultant data as a base value (step 85).

Subsequently, the average calculation section 7 performs the following processing for each of the N data extracted by the upper N values detecting section 12.

First of all, it is checked whether data at the corresponding point is stored in the storage section 1 (step 86). If it is determined that the data is stored, the currently obtained value is added to the value stored at the point to generate data 1 (step 87). If it is determined in step 86 that the data is not stored in the storage section 1, the base value stored in the base value calculation section 13 is added to the currently obtained value to generate data 2 (step 88).

When this processing is complete for the upper N values (step 89), the average calculation section 7 adds the current threshold to the value at another point in the storage section 1 to generate data 3 (step 90).

The average calculation section 7 sorts data 1, 2, and 3 and stores them in the storage section 1 (step 91). In this case, if the number of data obtained by sorting data 1, 2, and 3, exceeds M, only the M data are stored in the storage section 1 and the other data are discarded.

When the above processing is performed the predetermined number of times of slot averaging, the procedure is ended (step 92).

This slot average calculation processing will be described in more detail next with reference to FIGS. 11A to 11C. Each of FIGS. 11A to 11C shows how power values are added at a given point.

FIG. 11A shows a case wherein the power values obtained at a given point do not greatly change. FIG. 11B shows a case wherein the obtained power values gradually decrease. FIG. 11C shows a case wherein the obtained power values gradually increase.

Referring to FIGS. 11A to 11C, the hatched blocks indicate thresholds, and the remaining blocks indicate data.

Referring to FIG. 11A, all the first to third data fall within the upper N power values, and hence are added. However, the fourth data falls outside the upper N power values owing to some incidental cause such as fading. For this reason, the threshold corresponding to the fourth data is added instead. The fifth and subsequent data fall within the upper N power values again, and hence are added.

As described above, when no power value is obtained at a given point due to some incidental cause, the corresponding threshold is added instead of the data at the given point. This prevents a great decrease in data as a cumulative value.

Referring to FIG. 11B, although all the first to fourth data fall within the upper N powers value, the Nth and subsequent data fall outside the upper N power values for some reason, e.g., an increase in distance between the base station and the mobile station. For this reason, the corresponding thresholds are added to the cumulative value at the fifth and subsequent operations. Since only the thresholds are added to the data at this point, the rank of the data gradually descends among the data stored in the storage section 1. If the data falls outside the upper M power values, the data is discarded.

As described above, at a point where the obtained power value gradually decreases, only thresholds are added to the data at the point. As a result, the data is discarded from the upper M data.

Referring to FIG. 11C, since the first to fourth data fall outside the upper N power values, the data at this point are not stored. Since the fifth data falls within the upper N power values for the first time, the average calculation section 7 adds the base value to the current data to generate new data and stores it in the storage section 1.

As described above, a base value as a past cumulative value is added to data at a point where the obtained power value gradually increases. This allows appropriate comparison between the data at this point and the data at other points.

According to the slot timing detection circuit 3 of this embodiment, the amount of data to be held in the storage section 1 is 20×(32 bits (data)+14 bits (point information)), provided that M=20. This amount is 1/356 the memory capacity in the prior art (10,240×32 bits). Since the slot timing detection circuit of this embodiment can reduce the memory required for slot average calculation processing in this manner, the circuit size can be reduced.

In addition, the slot timing detection circuit of this embodiment only needs to read/write data in/from the storage section 1 M times in slot average calculation processing in a 1-slot interval. The time required for data read/write can therefore be greatly reduced as compared with the prior art in which the average calculation section performs read/write processing 10,240 times.

Furthermore, the slot timing detection circuit of this embodiment uses F/Fs and the like that demand a short read/write time instead of an external RAM that demands a long read/write time because the storage capacity required for the storage section 1 is small. This can greatly reduce the number of read/write operations with respect to the storage section 1. With this synergistic effect, the time required for slot average calculation processing can be greatly shortened.

In this embodiment, the number N that can be set in the upper N values detecting section 12 can be set to an arbitrary value equal to or less than the number M of data stored in the storage section 1. To make the storage section 1 store points at which small power values are obtained as many as possible, the number N set in the upper N values detecting section 12 may be set to be equal to the number M of data stored in the storage section 1.

In this embodiment, the power calculation section 11 performs four-times oversampling to obtain 32-bit data. However, the present invention is not limited to these values and can be applied to other values as well.

Furthermore, in this embodiment, the digital data 4 having a bit width of eight bits is obtained by A/D-converting a baseband signal. However, the present invention is not limited to eight bits and can be applied to a case wherein the digital data 4 is a signal having a bit width other than eight bits.

What is claimed is:

1. A slot timing detection method of expressing correlation results as power values every time received data is despread, calculating an average of the power values in a plurality of slot intervals, and detecting a slot timing as a timing of transmission of time slots from a base station by using data of the obtained average, comprising the steps of:

storing data of power values, which fall within predetermined upper N power values in a decreasing order of power values, and setting Nth data as a threshold, wherein N is an integer greater than zero and power values in correspondence with point information as the ordinal numbers of data, accumulating the thresholds in the respective slot intervals to obtain a base value;

storing predetermined M data of said data of the power values in correspondence with point information; wherein M is an integer greater than zero when data corresponding to the points corresponding to the N data fall within the M data, adding currently obtained data to the data at each point to generate new data;

when data corresponding to the points corresponding to the N data fall outside the M data, adding currently obtained data to the base value to generate new data;

generating new data by adding the threshold to data, of the M data, which corresponds to a point at which no data falls within the N data;

when the number of newly generated data is not less than M, storing upper M data together with point information; and when slot averaging is performed a predetermined number of times, dividing the M data by the predetermined number and outputting the quotient as an average value.

2. A method according to claim 1, wherein N is equal to M.

3. A slot timing detection circuit for expressing correlation results as power values every time received data is despread, calculating an average of the power values in a plurality of slot intervals, and detecting a slot timing as a timing of transmission of time slots from a base station by using data of the obtained average, comprising:

a correlation detection section for obtaining correlations between spreading codes and digital data obtained by A/D-converting a baseband signal obtained by demodulating a received signal, and outputting the obtained correlations as correlation values every chip period;

a power calculation section for converting the correlation values output from said correlation detection section into power values every points information as ordinal numbers of data;

an upper N values detecting section for storing data of power values, of the power values at the respective points output from said power calculation section, which fall within predetermined upper N power values in a decreasing order of power values, and setting Nth data as a threshold, wherein N is an integer greater than zero;

a base value calculation section for obtaining a base value by accumulating thresholds obtained by said upper N values detecting section;

a storage section for storing predetermined M data of said data of the power values in correspondence with point information, wherein M is an integer greater than zero; and an average calculation section for loading M data stored in said storage section, together with corresponding points, when data corresponding to points corresponding to the N data input from said N values detection section are present in the loaded data, generating new data by adding currently obtained data to the data at the corresponding points, when data corresponding to points corresponding to the N data input from said N values detection section are not present in the loaded data, generating new data by adding currently obtained data to the base value, generating new data by adding the threshold to data, of the loaded data, which corresponds to a point at which no corresponding data is output from said upper N values detecting section, when the number of newly generated data is not less than M, storing upper M data in said storage section, together with point information, when slot averaging is performed a predetermined number of times, dividing the data stored in said storage section by the predetermined number and outputting the quotient as an average value.

4. A circuit according to claim 3, wherein said correlation detection section comprises a matched filter.

5. A circuit according to claim 3, wherein said correlation detection section comprises a correlator bank.

6. A circuit according to claim 3, wherein N is equal to M.

7. A mobile station comprising said slot timing detection circuit defined in claim 3.

8. A mobile station for detecting a slot timing by the slot timing detection method defined in claim 1.

9. A mobile communication system comprises said mobile station defined in claim 7 and a plurality of base stations.

* * * * *